US008195512B2

(12) United States Patent
Shuhy et al.

(10) Patent No.: US 8,195,512 B2
(45) Date of Patent: Jun. 5, 2012

(54) SYSTEM AND METHOD FOR SERVING RELEVANT QUESTION-BASED ADVERTISEMENTS

(76) Inventors: Joseph Franklin Shuhy, Merritt Island, FL (US); James A. Taylor, Melbourne, FL (US)

( * ) Notice: Subject to any disclaimer, the term of this patent is extended or adjusted under 35 U.S.C. 154(b) by 609 days.

(21) Appl. No.: 11/980,212

(22) Filed: Oct. 30, 2007

(65) Prior Publication Data

US 2008/0281704 A1 Nov. 13, 2008

Related U.S. Application Data

(60) Provisional application No. 60/856,671, filed on Nov. 3, 2006.

(51) Int. Cl.
*G06Q 30/00* (2012.01)
(52) U.S. Cl. ....................................... 705/14.4
(58) Field of Classification Search .................... 705/14, 705/14.4
See application file for complete search history.

(56) References Cited

U.S. PATENT DOCUMENTS

| | | | |
|---|---|---|---|
| 5,724,521 A | 3/1998 | Dedrick | |
| 6,098,065 A | 8/2000 | Skillen | |
| 6,102,406 A * | 8/2000 | Miles et al. | 273/430 |
| 6,876,997 B1 | 4/2005 | Rorex | |
| 7,028,072 B1 | 4/2006 | Kliger | |
| 7,136,875 B2 | 11/2006 | Anderson | |
| 2001/0027417 A1 * | 10/2001 | Sato | 705/14 |
| 2002/0046087 A1 * | 4/2002 | Hey | 705/14 |
| 2002/0046095 A1 * | 4/2002 | Wallace | 705/14 |
| 2002/0112233 A1 * | 8/2002 | Cantu Bonilla et al. | 725/23 |
| 2002/0120504 A1 * | 8/2002 | Gould et al. | 705/14 |
| 2002/0143630 A1 * | 10/2002 | Steinman et al. | 705/14 |
| 2002/0198791 A1 * | 12/2002 | Perkowski | 705/26 |
| 2003/0023487 A1 * | 1/2003 | Day | 705/14 |
| 2004/0162757 A1 * | 8/2004 | Pisaris-Henderson et al. | 705/14 |
| 2005/0144065 A1 * | 6/2005 | Calabria et al. | 705/14 |
| 2007/0033107 A1 * | 2/2007 | Ubale et al. | 705/14 |
| 2007/0124201 A1 * | 5/2007 | Hu et al. | 705/14 |
| 2007/0192179 A1 * | 8/2007 | Van Luchene | 705/14 |
| 2010/0280906 A1 * | 11/2010 | Lim et al. | 705/14.66 |

OTHER PUBLICATIONS

"Ask Jeeves Launches Innovative Advertising Products on Ask.com," PR Newswire, Mar. 19, 2001.*

* cited by examiner

*Primary Examiner* — Michelle Tarae (57) ABSTRACT

Question-based advertising over a network where question-based advertisement selection takes into consideration the content of adjacent material. In various aspects, the adjacent material may be physical and in proximity to a terminal where the question is presented, it may be virtual and be displayed on the same terminal as the question, and it may precede or succeed the question in time.

24 Claims, 10 Drawing Sheets

SYSTEM AND METHOD FOR SERVING RELEVANT QUESTION-BASED ADVERTISEMENTS

CROSS-REFERENCE TO RELATED APPLICATION

This application claims the benefit of U.S. Provisional Patent Application No. 60/856,671, filed Nov. 3, 2006, and which is herein incorporated by reference in its entirety under 35 U.S.C. §120.

BACKGROUND OF THE INVENTION

There are various successful advertising methods employed over the Internet. Most of these include paid search engine ranking and advertisements, search engines that award prizes to its users, text ads or banner ads on websites, and pop-up/pop-under ads. These ads may be based on a search term or content of a web page where an ad is displayed. These ads are not formatted as questions used to engage a participant and entice them to research a question and submit an answer.

The common form of current Internet ads are known to be susceptible to click fraud since no action other than clicking on an advertisement is required from a participant for an advertiser to be charged. Using a question based advertisement allows the option of only charging advertisers for participants who submit any answer or a correct answer, thus requiring further action from a participant and hindering fraudulent charges to advertisers.

Television stations currently use prerecorded advertisements to pay for their broadcasting costs and make profit. With the impending distribution of interactive television that will result in television broadcast reception devices to effectively act like, if not become, networked computers, there is opportunity for using content based questions to entice a participant to research a question and submit an answer.

There are also stand-alone networked terminal systems that may use standard or proprietary protocols for communication between those terminals. Terminals such as those could also be used for content based questions to entice a participant to research a question's answer. A question may be based on other information a participant has accessed on a terminal or based on the physical surroundings of a terminal. This type of terminal may be found in restaurants, bars, arcades, casinos, or other locations.

For Internet advertising, ads based on search engine results or web page content have been used. These ads have not been questions used to entice visitors to research and learn more about a product or service in order to correctly answer the question. Television advertising is also passive, with predetermined commercials occurring in predetermined time slots. They have not used a participant's television show preferences or a particular television show's current content to provide question based advertisements that would appeal to a participant, entice them to research a product or service, and submit an answer to the question.

There is a need for an advertising method that engages the consumer by taking into consideration the consumers interests or surroundings, and provides educated consumers to the advertisers.

SUMMARY OF THE INVENTION

Systems and methods for conducting question-based advertising over a network where question-based advertisement selection takes into consideration the content of adjacent material. An advertiser's question is chosen based on content of adjacent material. The adjacent material may be logically surrounding the placement of a question-based advertisement on a rendered display, physically surrounding a network terminal, or preceding or succeeding an advertisement in time. A participant is enticed by the question to research a product or service, and submit an answer to the question. In one aspect, an Internet search engine takes into consideration the search term provided by a user to select a question-based advertisement of interest to the user. In another aspect, a television viewer's programming preferences are used as the adjacent material and are taken into consideration to determine a question-based advertisement of interest to the viewer.

Related methods of operation are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate several aspects described below and together with the description, serve to explain the principles of the invention. Like numbers represent the same elements throughout the figures.

DETAILED DESCRIPTION

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used in the specification and the appended claims, the singular forms "a," "an" and "the" comprise plural referents unless the context clearly dictates otherwise.

Ranges can be expressed herein as from "about" one particular value, and/or to "about" another particular value. When such a range is expressed, another embodiment comprises from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance can or can not occur, and that the description comprises instances where said event or circumstance occurs and instances where it does not.

The present invention relates to a question-based advertisement where the selection of a question-based advertisement takes into consideration the content of adjacent material. The adjacent material may be logically surrounding the placement of the question-based advertisement on a rendered display, it may be physically surrounding the network terminal, or it may be preceding or succeeding an advertisement in time. Question-based advertisements can be an attractive advertising medium to product manufacturers and service providers as it can actively educate consumers about an offering, which can include but is not limited to, a product, a service, and the like.

A question may include text, images, audio, video, or content in other formats. A question may present no answer options, one answer, or many answer options. A question may allow a participant to submit an answer. A question may be presented with an option of going to a web page or other alternate location for submitting an answer. A question may present a participant with an option of visiting a question sponsor's web site or viewing other information provided by a sponsor. A question may be tied into a broader system or game where other questions are available for a participant to answer or a question may be a lone entity. An Internet advertisement question may be rendered on a web page, placed in a web browser's toolbar, displayed in a separate window, or placed elsewhere. Questions that are presented to a participant may be chosen based on most relevant content, highest bidder for a keyword, highest bidder for a time slot, combinations of these, or other criteria.

An aspect can require participants to play as individuals or allow a group of people to play as a single participant entity.

In one aspect, a system and method for advertising is provided. In one aspect the system comprises a server and at least one terminal, in communication with the server via a network. The server and the terminal can be a computing device, an example of which is described with reference to block 1101 in FIG. 12. The server can have a means for providing at least one question to a terminal wherein the at least one question is provided to the at least one participant who can submit an answer for the question. The server can further have a means for receiving an answer to the at least one question from the terminal, a means for determining the correctness of the answer, and a means for associating the answer with the at least one participant.

The at least one terminal can have a means for presenting the at least one question to the at least one participant, a means for receiving the answer to the at least one question from the at least one participant, and a means for sending the answer to the server.

Figure 12:
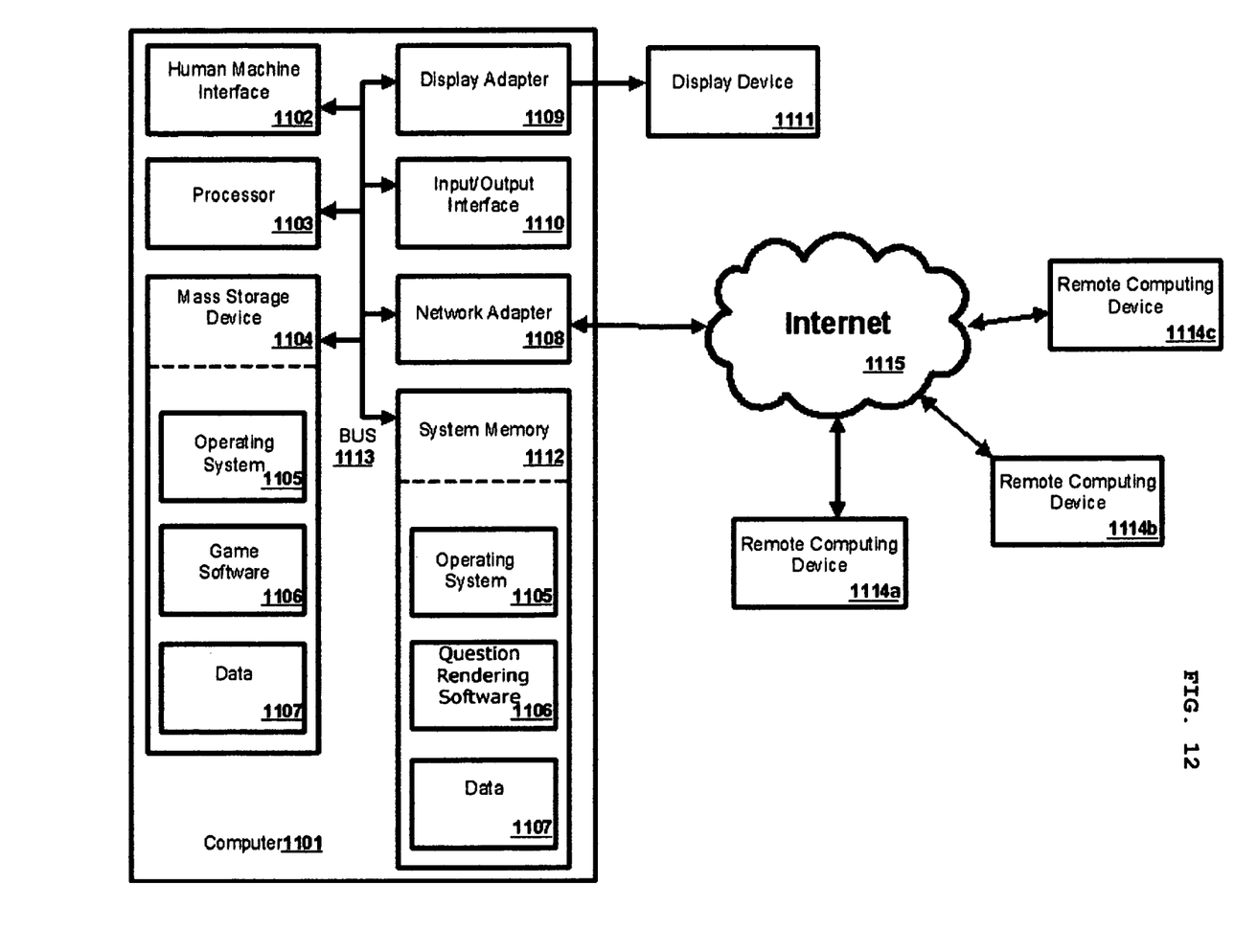
FIG. 12 is a block diagram representing an exemplary operating environment.

One skilled in the art will appreciate that the system description is a functional description and that the respective functions can be performed by software, hardware, or a combination of software and hardware. A means for performing these functions can be software, hardware, or a combination of software and hardware. The means can comprise the Question Rendering Software 1106 as illustrated in FIG. 12 and described below. In one exemplary aspect, the system can comprise the system as illustrated in FIG. 12 and described below.

FIG. 12 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The system and method of the present invention can be operational with numerous other general purpose or special purpose computing system environments or configurations. Examples of well known computing systems, environments, and/or configurations that can be suitable for use with the system and method comprise, but are not limited to, personal computers, server computers, laptop devices, personal digital assistants, and multiprocessor systems. Additional examples comprise set top boxes, cable television receivers, satellite receivers, cellular phones, programmable consumer electronics, network PCs, minicomputers, mainframe computers, distributed computing environments that comprise any of the above systems or devices, and the like.

In another aspect, the system and method of the present invention can be described in the general context of computer instructions, such as program modules, being executed by a computer. Generally, program modules comprise routines, programs, objects, components, data structures, etc. that perform particular tasks or implement particular abstract data types. The system and method of the present invention can also be practiced in distributed computing environments where tasks are performed by remote-processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 1101. The components of the computer 1101 can comprise, but are not limited to, one or more processors or processing units 1103, a system memory 1112, and a system bus 1113 that couples various system components including the processor 1103 to the system memory 1112.

The system bus 1113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, Accelerated Graphics Port (AGP) bus, and a Peripheral Component Interconnects (PCI) bus also known as a Mezzanine bus. The bus 1113, and all buses specified in this description can also be implemented over a wired or wireless network connection and each of the subsystems, including the processor 1103, a mass storage device 1104, an operating system 1105, question rendering software 1106, data 1107, a network adapter 1108, system memory 1112, an Input/Output Interface 1110, a display adapter 1109, a display device 1111, and a human machine interface 1102, can be contained within one or more remote computing devices, which can serve as terminals or servers, 1114*a,b,c* at physically separate locations, connected through buses of this form, in effect implementing a fully distributed system.

The computer 1101 typically comprises a variety of computer readable media. Exemplary readable media can be any available media that is accessible by the computer 1101 and comprises, for example and not meant to be limiting, both volatile and non-volatile media, removable and non-removable media. The system memory 1112 comprises computer readable media in the form of volatile memory, such as random access memory (RAM), and/or non-volatile memory, such as read only memory (ROM). The system memory 1112 typically contains data 1107 and/or program modules such as operating system 1105 and question rendering software 1106 that are immediately accessible to and/or are presently operated on by the processing unit 1103. Data 1107 can include, but is not limited to, An aspect can store long term information regarding participant accounts including, but not limited to, usernames and passwords, participant activities such as answers submitted and time of submissions, questions and corresponding answers including correct and incorrect answers, prizes including prize award criteria and past winners, advertisers including payment information and location of websites for Internet based games, and the like.

In another aspect, the computer 1101 can also comprise other removable/non-removable, volatile/non-volatile computer storage media. By way of example, FIG. 12 illustrates a mass storage device 1104 which can provide non-volatile storage of computer code, computer readable instructions, data structures, program modules, and other data for the computer 1101. For example and not meant to be limiting, a mass storage device 1104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1104, including by way of example, an operating system 1105 and question rendering software 1106. Each of the operating system 1105 and question rendering software 1106 (or some combination thereof) can comprise elements of the programming and the question rendering software 1106. Data 1107 can also be stored on the mass storage device 1104. Data 1107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 1101 via an input device (not shown). Examples of such input devices comprise, but are not limited to, a keyboard, pointing device (e.g., a "mouse"), a microphone, a joystick, a scanner, and the like. These and other input devices can be connected to the processing unit 1103 via a human machine interface 1102 that is coupled to the system bus 1113, but can be connected by other interface and bus structures, such as a parallel port, game port, serial port, IEEE 1394 Port also known as a Firewire port, or a universal serial bus (USB).

In yet another aspect of the present invention, a display device 1111 can also be connected to the system bus 1113 via an interface, such as a display adapter 1109. It is contemplated that the computer 1101 can have more than one display adapter 1109 and the computer 1101 can have more than one display device 1111. For example, a display device can be a monitor, an LCD (Liquid Crystal Display), or a projector. In addition to the display device 1111, other output peripheral devices can comprise components such as speakers (not shown) and a printer (not shown) which can be connected to the computer 1101 via Input/Output Interface 1110.

The computer 1101 can operate in a networked environment using logical connections to one or more remote computing devices 1114*a,b,c*. By way of example, a remote computing device can be a personal computer, portable computer, a server, a router, a network computer, a peer device or other common network node, and so on. Logical connections between the computer 1101 and a remote computing device 1114*a,b,c* can be made via a local area network (LAN) and a general wide area network (WAN). Such network connections can be through a network adapter 1108. A network adapter 1108 can be implemented in both wired and wireless environments. Such networking environments are conventional and commonplace in offices, enterprise-wide computer networks, intranets, and the Internet 1115. Other possible types of networks that can be used include, but are not limited to, a television distribution network, or a dedicated gaming network.

For purposes of illustration, application programs and other executable program components such as the operating system 1105 are illustrated herein as discrete blocks, although it is recognized that such programs and components reside at various times in different storage components of the computing device 1101, and are executed by the data processor(s) of the computer. An implementation of question rendering software 1106 can be stored on or transmitted across some form of computer readable media Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed system and method of the present invention can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

In one aspect, an Internet web page may be categorized by analyzing keywords in its content. The category is then used to determine a group of eligible question-based advertisements which may be displayed. A question from a highest bidder from the eligible question group is integrated into the web pages contents or a web browser tool bar and then presented to a participant. No answers are shown to the participant at this time. The advertisement indicates that correctly answering the question will enter the participant in a weekly drawing for a prize. The advertisement provides a link that will bring the participant to a web page where the question and multiple choice answers are presented. If the participant selects a correct answer, then they are encouraged to register for the game in order to claim the prize drawing entry they earned.

Figure 1:
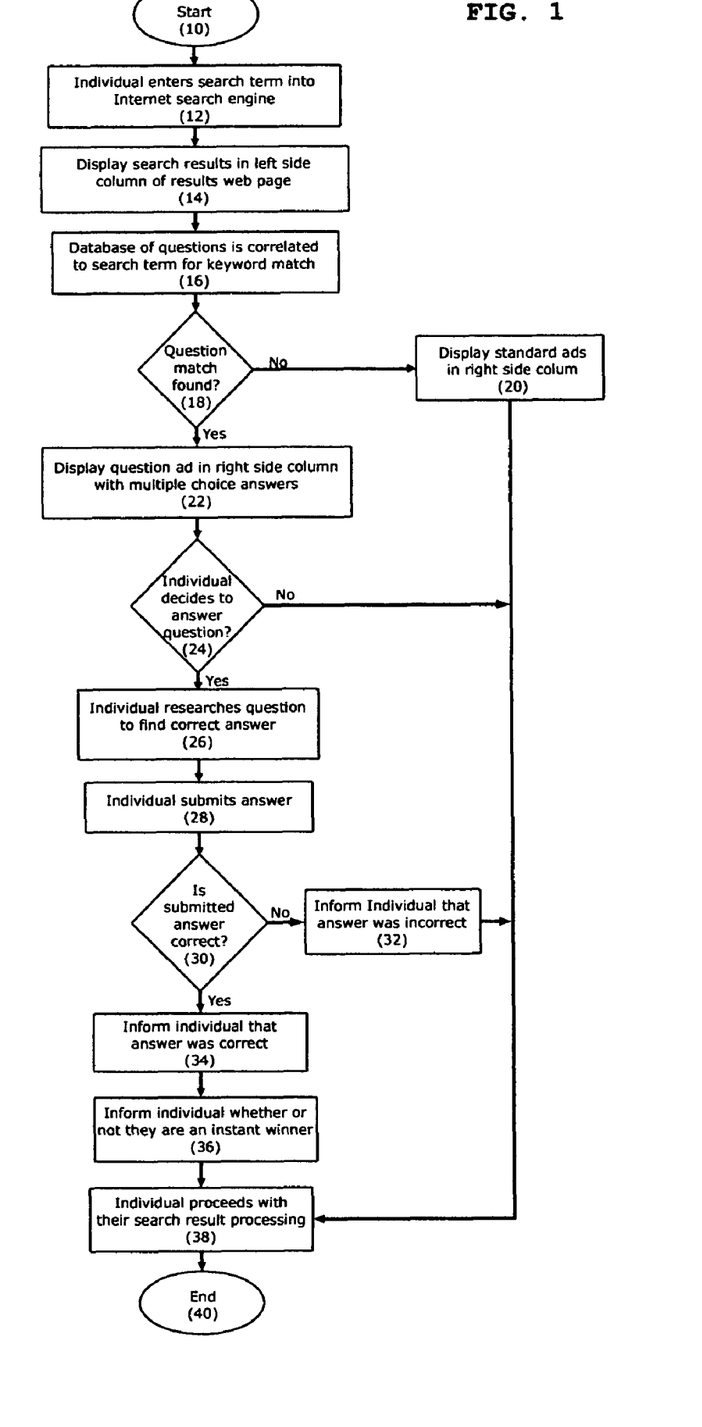
FIG. 1 is a flow diagram of one possible aspect of question-based ads that are relevant to an internet search engine term.

In another aspect, shown in FIG. 1, a participant uses an Internet search engine to locate websites of interest 12. The search term provided by the participant is used to determine a group of eligible text questions which may be displayed 16. Several text questions from highest bidders from the eligible question group are then presented to the participant in a column parallel to the search results 22. Multiple choice answers are displayed in conjunction with each question and the participant is provided a means of selecting and submitting an answer for each question 28. The web page indicates to the participant that correctly answering any of the questions provides an opportunity to instantly win a prize. If the participant selects a correct answer 30, then it is determined whether or not they are an instant winner. The participant is notified of their winning status 36.

Figure 2:
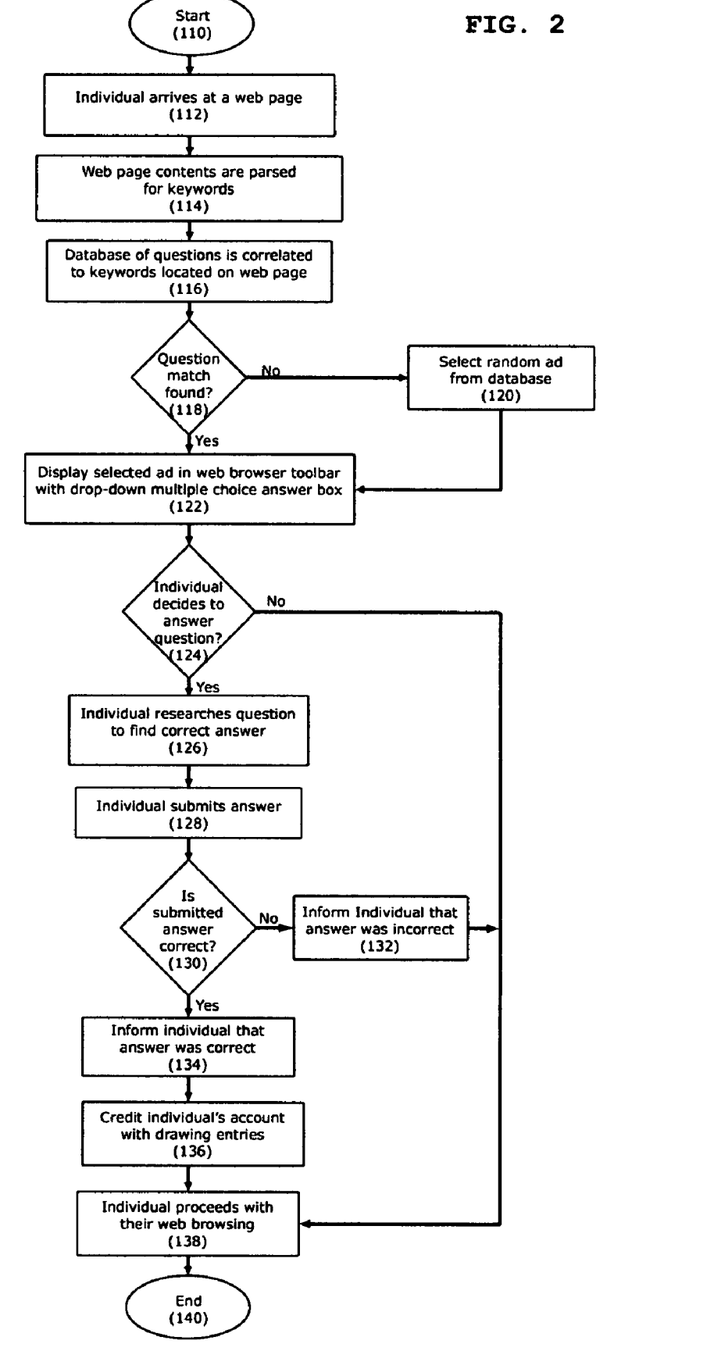
FIG. 2 is a flow diagram of one possible aspect of question-based ads that are relevant to a web page's contents.

In another aspect, shown in FIG. 2, a participant will install an Internet web browser toolbar application that is capable of displaying a question and receiving an answer. The toolbar is associated with a game that may award a prize. The toolbar can associate an answer selected by a participant with the participant's account in the game. As a participant visits web pages using a web browser with the installed toolbar application 112, the toolbar application processes a currently displayed web page's content to categorize the web page based on keywords in its content 114. The category is then used to determine a group of eligible text questions which may be displayed 116. A text question from a highest bidder from the eligible question group is then presented to the participant on the toolbar along with multiple choice answers 122. The participant can then attempt to correctly answer the question 128. The participant's game account is credited with an entry 136 if a correct answer is selected. Prizes are awarded by the game on a regular interval by random selection from all entries earned up to that point. All participants' entry counts are reset to zero after the drawing.

Figure 3:
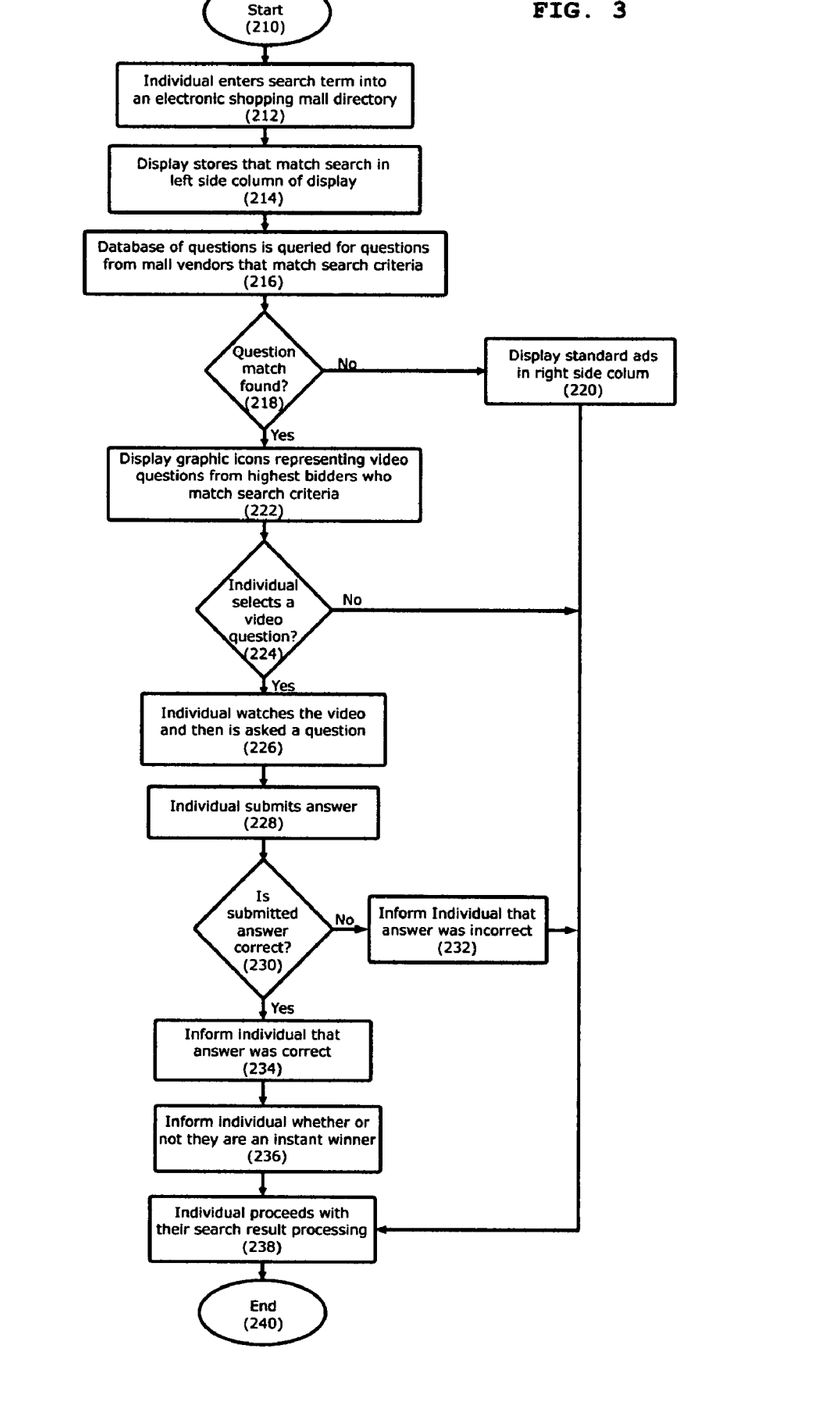
FIG. 3 is a flow diagram of one possible aspect of question-based ads that are relevant to a terminal's physical surroundings and location.

In one aspect, shown in FIG. 3, a local network terminal serves as a public access searchable shopping mall directory. A search term provided by a participant 212 is used to determine a group of eligible video questions from mall vendors which may be displayed 216. The questions are related to the stores physically surrounding the terminal and the location of the terminal. Several graphic icons representing different video questions from highest bidders from the eligible question group are presented to the participant for selection in a column parallel to the search results 222. The terminal's display indicates to the participant that correctly answering any of the questions provides an opportunity to instantly win a mall gift certificate. If the participant chooses one of the videos 224, then the selected video is played on the terminal. At the end of the selected video, a question based on the video's contents and multiple choice answers are displayed on the terminal 226. The participant is provided a means of selecting and submitting an answer 228. If the participant selects a correct answer 230, then it is determined whether or not they are an instant winner. The participant is notified of their winning status 236.

A local network system could provide user interaction with a participant through buttons, keyboards, touch screens, wireless connections to other devices, or any other available method determined to be suitable.

Figure 4:
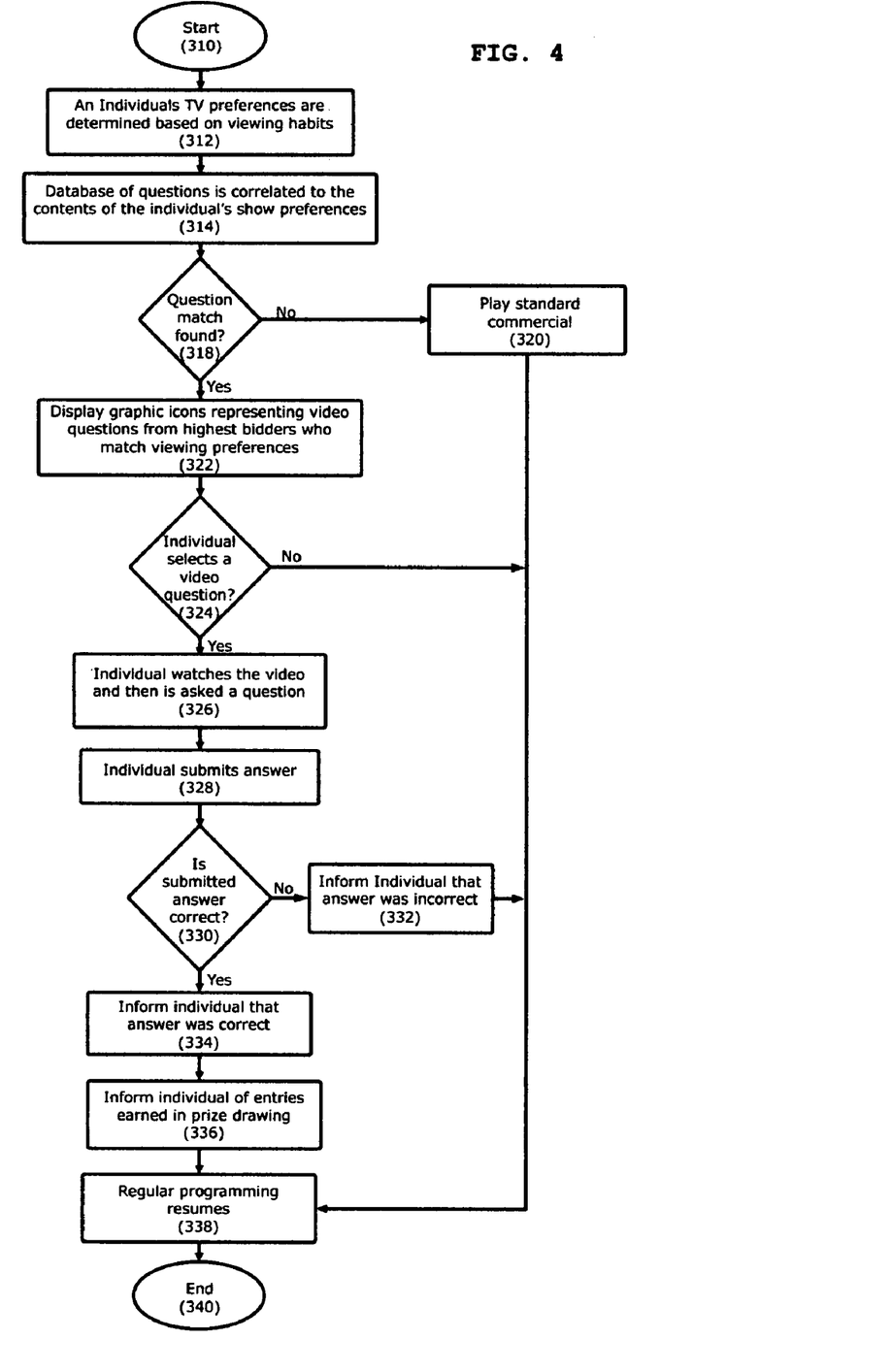
FIG. 4 is a flow diagram of one possible aspect of question-based ads that are relevant to a participant's television programming preferences.

In another aspect, shown in FIG. 4, an interactive television system uses a participant's historical television programming choices 312 to determine a group of eligible video questions from sponsors 314. During program breaks, the participant is provided opportunities to select between various video questions from highest bidders from the eligible group of questions 322. The television's display indicates to the participant that correctly answering any of the questions rewards the participant with entries into a drawing. If the participant chooses one of the videos 324, the selected video is played on the television. At the end of the video, a question based on the video's contents and multiple choice answers are displayed on the television 326. The participant is provided a means of selecting and submitting an answer 328. If the participant selects a correct answer 330, then entries are added to an account associated with the particular interactive television receiver 336.

Figure 11:
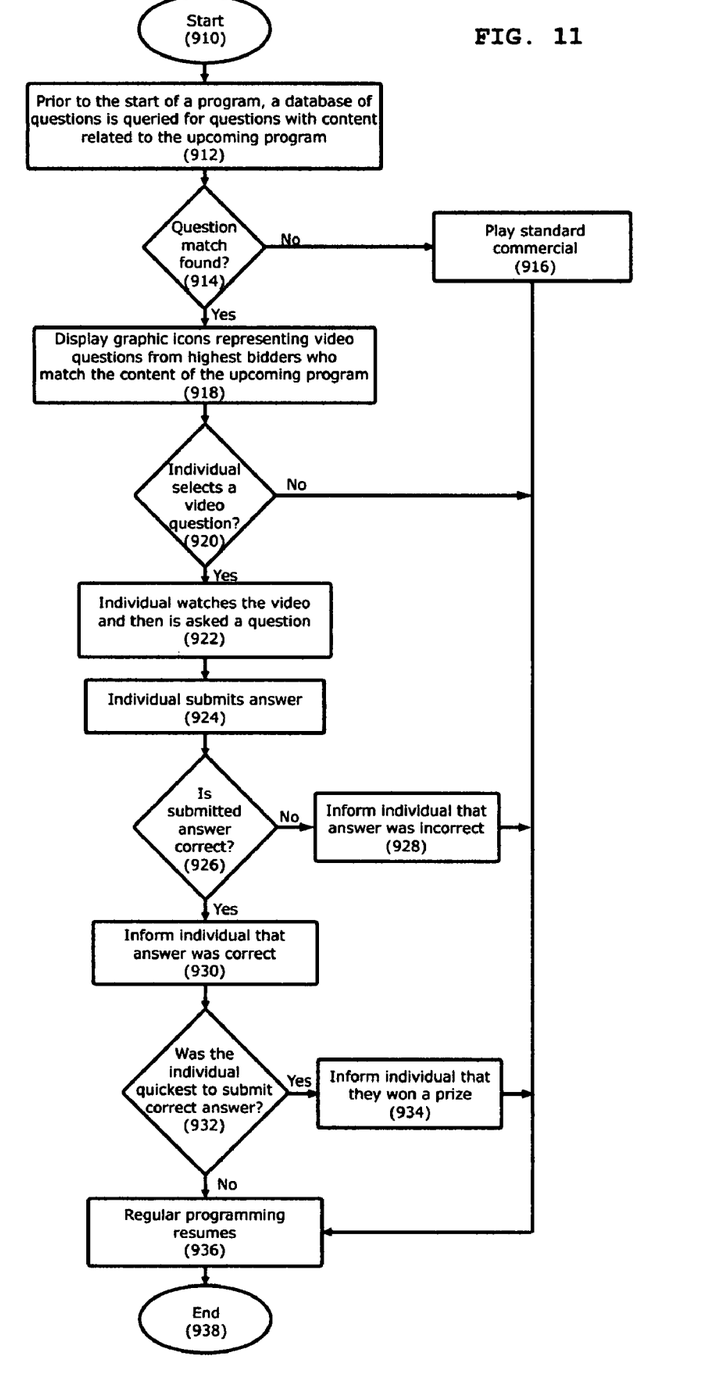
FIG. 11 is a flow diagram of one possible aspect of question-based ads that are relevant to an upcoming television program.

An aspect of an interactive television system may use the upcoming program to select a question based advertisement 912 as shown in FIG. 11. This would substantially follow the same process as just described with the exception of using the upcoming content rather than historical viewing preferences to select the advertisement. An aspect may select an instant winner from the participants based on time required to submit a correct answer 932, where the quickest participant is awarded a prize.

An interactive television system could provide interaction with a participant by methods provided by the interactive television system producer. This could include remote controls, joysticks, keyboards, or any other available method determined to be suitable.

Figure 8:
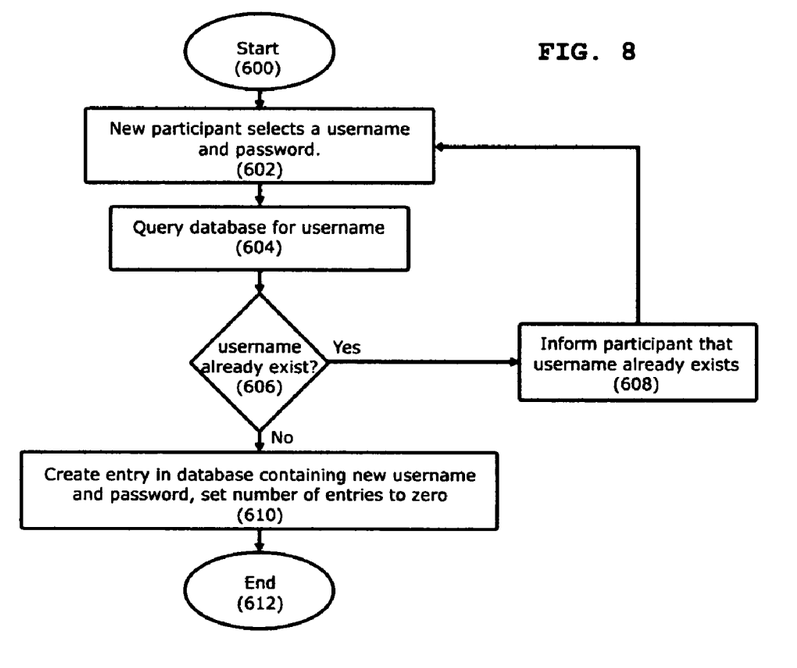
FIG. 8 is a flow diagram of one possible method for creating a participant account.

FIG. 8 shows one possible method for creating a participant account. The flowchart starts 600 when it is determined that a new participant account must be created. The new participant is asked to select a username and password 602 for the new account. A query of all existing accounts stored in a database is performed 604 to ensure the requested username for the new account is unique 606. If the requested username already exists in the database, then the participant is informed that they must select a different username 608 and they are again asked for a username and password 602. If the username does not exist, then a new account record is added to the database where the new username and password are stored 610. The number of entries won by the participant that is stored in the account record is initialized to zero. This ends 612 the account creation process and the new participant can log in to their unique account.

Figure 9:
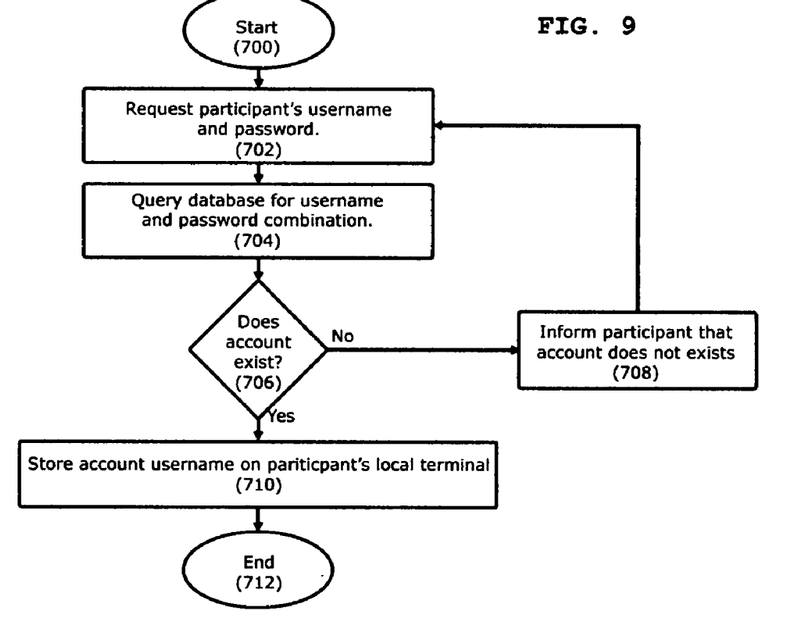
FIG. 9 is a flow diagram of one possible log in verification process.

FIG. 9 shows one possible log-in verification process. The flowchart starts 700 when a participant arrives and elects to log in to their unique account. The participant is asked to submit their username and password 702. The database is queried for an account record that matches the username and password 704 specified by the participant to ensure the participant has an existing account 706. If no account matches the username and password, the participant is informed that the information they provided was not valid for an existing account 708 and they are again asked for their username and password 702. If the account was found, then identifying information is stored on the participant's local terminal 710 so the participant can be identified again later. This ends 712 the log in process and the participant can now receive credit to their unique account for correctly answering questions.

In another aspect, the user account may be associated with a terminal and not a specific participant, and no log-in may be required. An example of this would be a television viewer's receiver acting as a local terminal on a network where the receiver is already uniquely identified and correct answers could be credited to the account associated with the particular receiver.

In another aspect, no user account is associated with a participant, all prizes are awarded instantly, and winning participants immediately receive a printed ticket from the terminal indicating their winnings. Similarly, a terminal without accounts may send instant winner information to a local main server that is staffed, where the staff distributes prizes to winners.

Figure 10:
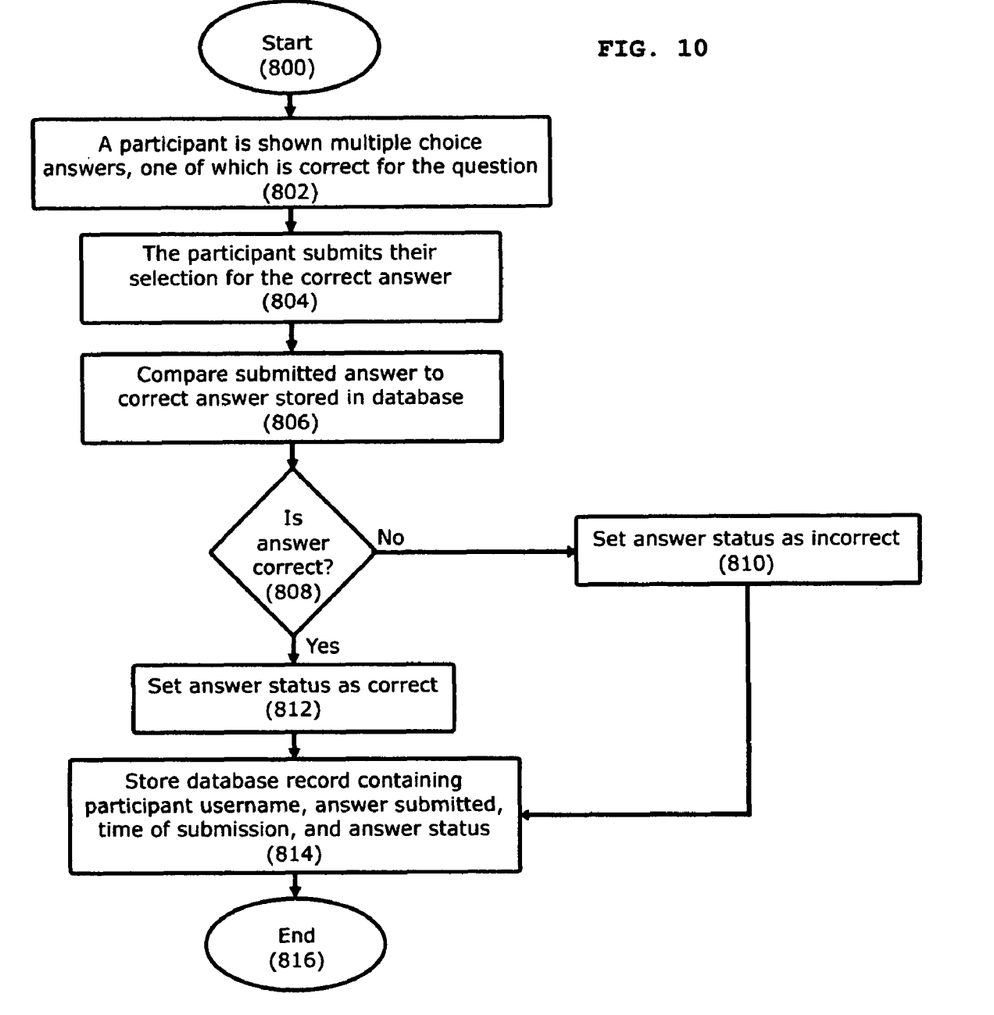
FIG. 10 is a flow diagram of one possible process for determining if an answer submitted by a participant is correct.

FIG. 10 shows one possible process for determining if an answer submitted by a participant is correct. The flowchart starts 800 when the participant has viewed the question and needs to make their selection of a correct answer 802. The participant here is shown a multiple choice set of answers from which they can select where at least one of the displayed answers is correct. The participant makes their answer selection which is submitted to the server 804. The answer submitted is compared against the known correct answer set that is stored in a database record associated with the particular question 806 and it is determined if the submitted answer is correct or incorrect 808. If the answer is incorrect, an answer status is stored indicating that the answer was incorrect 810. If the answer is correct, an answer status is stored indicating that the answer was correct 812. Both incorrect and correct answer submissions are stored in a database record. This record contains the participant's account identification, the question number, the answer submitted, a time tag indicating when the answer was submitted, and the answer status that was previously determined 814. This ends 816 the answer verification process.

A fee can be collected from the advertisers whose offerings are the basis of questions provided to participants. In an aspect, the cost to the advertiser can be based on a per impression rate, per click rate, per answer rate, per correct answer rate, flat fee, and the like. Determining the pricing rate can be based on a standard rate card (advertising price list), by a bidding process, and the like. An aspect of a bidding system can allow the advertiser to select certain criteria for when they would prefer their questions to be provided to participants. These criteria may include time, terminal location, participant location, keywords, categories, question media type, any combination of these, or any other criteria deemed appropriate. Bids for question placement can be done over the Internet, by phone, by postal mail, through an agent, and the like.

Figure 7:
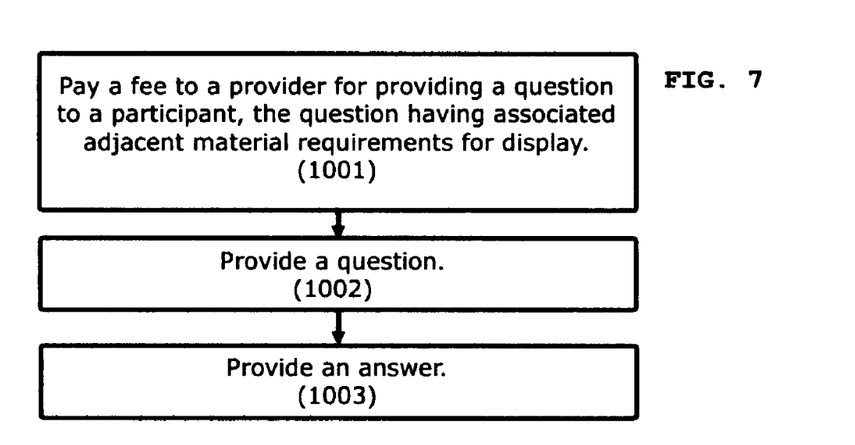
FIG. 7 is a flow diagram representing an exemplary implementation of providing questions and answers.

Also disclosed is a method for advertising, illustrated in FIG. 7, comprising paying a fee to a provider for providing at least one question to at least one participant wherein the at least one question is selected based on the content of adjacent material, and the at least one participant can submit an answer for the question 1001. The method can further comprise generating at least one question 1002. The method can also further comprise generating an answer set consisting of at least one correct answer and at least one incorrect answer to the at least one question 1003. The advertiser can generate the question, or a third party can generate the question. The advertiser can generate the answer set, or a third party can generate the answer set. The question-based advertisement funded by the advertiser can have the same features as described above, omitted here for brevity.

Figure 5:
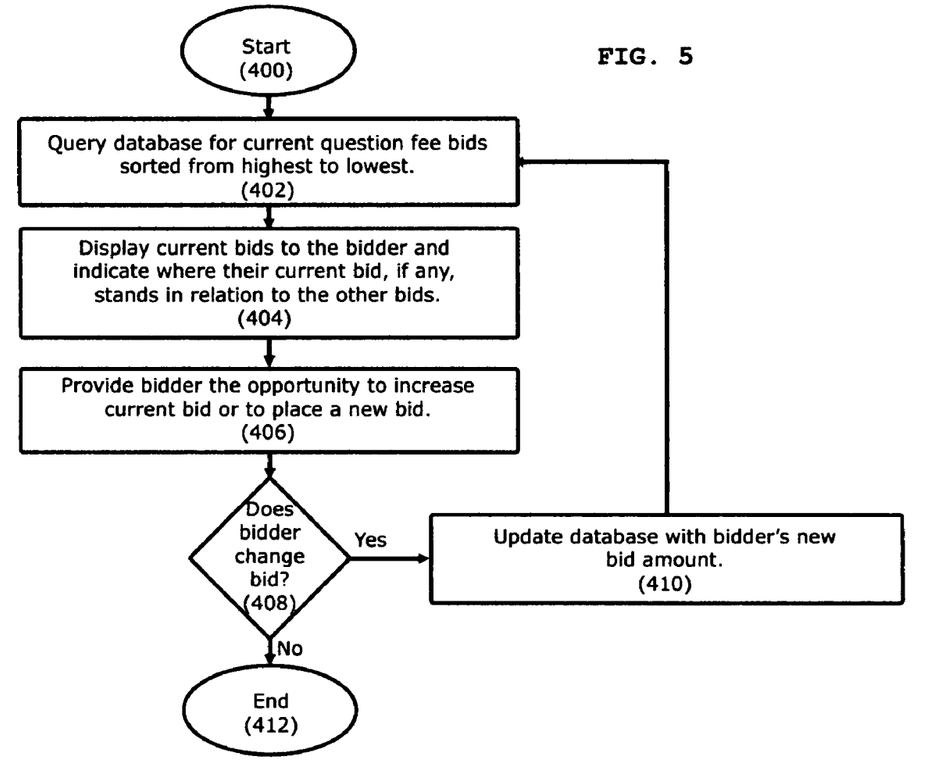
FIG. 5 is a flow diagram of one possible process for advertisers to bid on a question fee in order to have their questions included in a question set.

FIG. 5 shows an exemplary aspect of an Internet bidding process. As the bidding process starts 400, a database is queried for the current bids and is sorted from highest to lowest 402. The current bids are displayed for the current bidder, and their current bid's position, if any, is told to the bidder 404. This gives the bidder a reference for their current cost and the effect of increasing or decreasing their current bid. The bidder is presented with an editable field where they can enter a new bid amount and a button to click to submit the new bid 406. If the bidder changes their bid 408, then the new bid is stored in the database 410 and the database is again queried to access all bids 402 so that the bidder can see their new bid position. The process ends when the bidder elects not to submit a new bid amount 412.

Figure 6:
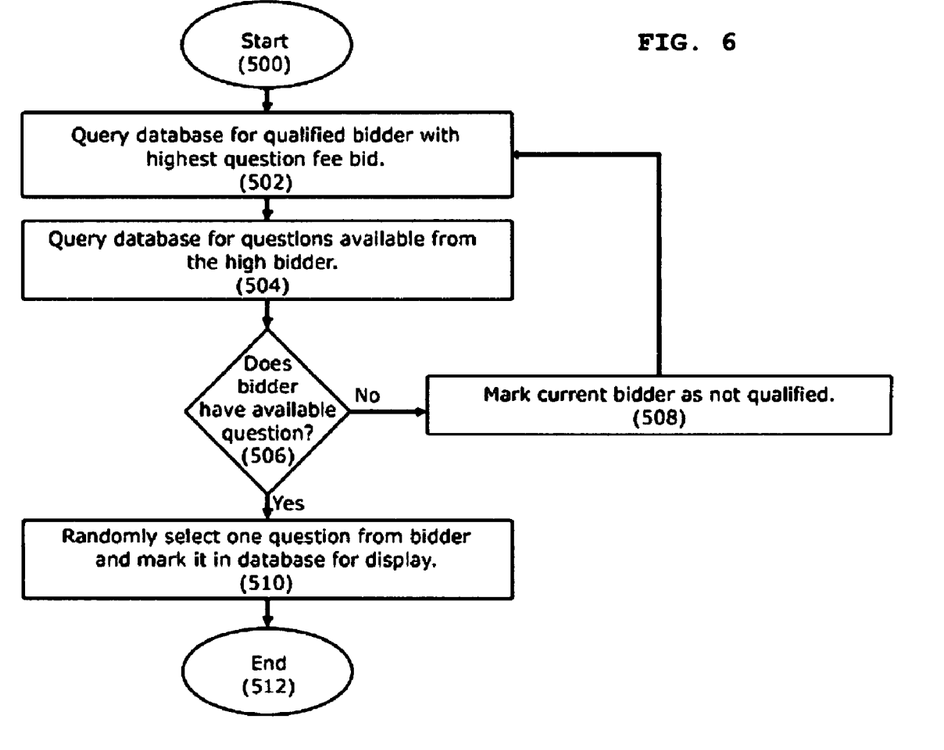
FIG. 6 is a flow diagram of one possible process for selecting questions to display to a participant based on an advertiser's bids and question availability.

FIG. 6 shows one aspect of the process of selecting a question-based advertisement from a bidding system. The flowchart starts 500 when a question needs to be chosen. The database is queried for the highest bidding advertiser whose advertisement qualifies as matching the adjacent material 502, where a qualified advertiser is one which has not been disqualified during this question selection process. The database is queried for an available question-based advertisement from the highest bidding advertiser 504. An aspect can allow advertisers to limit the number of their question-based advertisements that are displayed for specific adjacent material. If an advertiser hits their preset limit for the number of advertisements they want show with any given adjacent material, then they are no longer qualified. If the advertiser does not have any questions available 506, then they are marked as not qualified and the database is again queried for the highest bidding qualified advertiser 502. If the advertiser does have questions available 506, then one of their available questions is randomly chosen 510 for display. This ends 512 the process of selecting a question for display. This process can be repeated until all available advertisement slots are filled.

While this invention has been described in connection with preferred aspects and specific examples, it is not intended that the scope of the invention be limited to the particular aspects set forth, as the aspects herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of aspects described in the specification.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A method for advertising, comprising:
   (a) at least one server searching at least one database and selecting at least one question from the at least one database; wherein the at least one question is itself a question based advertisement associated with at least one advertiser;
   (b) providing the at least one question on at least one terminal to at least one participant wherein the at least one question is selected based on adjacent material; wherein the adjacent material is material other than an advertisement that corresponds to the at least one question, wherein the adjacent material is material other than another question based advertisement, wherein the at least one question is provided in a form factor other than a website of the at least one advertiser;
   (c) transmitting the at least one question to the at least one terminal over a network connection capability between the at least one terminal and the at least one server;
   (d) the at least one terminal receiving an answer to the at least one question from the at least one participant;
   (e) transmitting information related to the at least one participant and related to the answer to the at least one question over the network connection capability to the at least one server; and
   (f) the at least one server using said information to associate the answer-related information with the at least one participant.

2. The method of claim 1 wherein the adjacent material is at least one physical object other than the terminal and is placed in proximity to a location where the at least one question is presented to the at least one participant.

3. The method of claim 1 wherein the adjacent material is a location where the at least one question is presented to the at least one participant.

4. The method of claim 1 wherein the adjacent material is virtual and is presented to the at least one participant preceding in time the at least one question.

5. The method of claim 4 wherein the virtual material has been selected by the at least one participant over a period of time.

6. The method of claim 1 wherein the adjacent material is virtual and is presented to the at least one participant succeeding in time the at least one question.

7. The method of claim 1 wherein the adjacent material is virtual and is presented to the at least one participant in proximity to the location of the at least one question.

8. The method of claim 7 wherein the adjacent material is results produced by a network search engine.

9. The method of claim 7 wherein the adjacent material is contents of a web page.

10. The method of claim 9 wherein the at least one question is displayed on a web browser toolbar.

11. The method of claim 1 wherein an advertiser pays a fee for the at least one question provided, wherein the at least one question is related to an offering.

12. The method of claim 11 wherein a fee's cost rate is based on a rate card.

13. The method of claim 11 wherein a fee's cost rate is based on a bidding process.

14. The method of claim 13 wherein the advertiser places a bid for the at least one question to be provided to the at least one participant at a specific time.

15. The method of claim 13 wherein the advertiser places a bid for the at least one question to be provided to the at least one participant for specific adjacent content.

16. The method of claim 13 wherein the advertiser places a bid for the at least one question to be provided to the at least one participant in a specific ranked order within a plurality of advertisements.

17. The method of claim 1 wherein a prize is awarded to the at least one participant.

18. The method of claim 17 wherein a recipient of the prize is the at least one participant who submitted a correct answer for the at least one question.

19. The method of claim 17 wherein a recipient of the prize is the at least one participant with the shortest time required to submit a correct answer to the at least one question.

20. The method of claim 17 wherein a recipient of the prize is determined by a random drawing from contest entries earned by the at least one participant for submitting an answer to the at least one question.

21. A method for advertising, comprising:
    (a) paying a fee to a provider for providing at least one question to at least one participant; wherein the at least one question is itself a question based advertisement associated with at least one advertiser;
    (b) at least one server searching at least one database and selecting the at least one question from the at least one database;
    (c) providing the at least one question on at least one terminal to the at least one participant wherein the at least one question is selected based on adjacent material; wherein the adjacent material is material other than an advertisement that corresponds to the at least one question, wherein the adjacent material is material other than another question based advertisement, wherein the at least one question is provided in a form factor other than a website of the at least one advertiser;
    (d) transmitting the at least one question to the at least one terminal over a network connection capability between the at least one terminal and the at least one server;
    (e) the at least one terminal receiving an answer to the at least one question from the at least one participant;
    (f) transmitting information related to the at least one participant and related to the answer to the at least one question over the network connection capability to the at least one server; and
    (g) the at least one server using said information to associate the answer-related information with the at least one participant.

22. The method of claim 21, further comprising generating the at least one question.

23. The method of claim 21, further comprising generating an answer to the at least one question.

24. A system for advertising, comprising a source of at least one question wherein the at least one question selected is based on adjacent material other than the advertisement that corresponds to the at least one question, wherein the at least one question is itself a question based advertisement associated with at least one advertiser; wherein the adjacent material is material other than another question based advertisement, wherein the at least one question is provided in a form factor other than a website of the at least one advertiser; said source being adapted to transmit advertising information of different contents substantially corresponding to the at least one question in different advertising mediums and formed as a server means; a plurality of network terminals, each of said terminals being provided with a network connection capability for receiving the advertising information of different contents, each of said terminals being provided with an output capability for presenting advertising information to at least one participant, each of said terminals being provided with an input capability for receiving input from the at least one participant; said server means being formed so as to transmit to said terminals, while said further means in each of said terminals is formed so as to enable input of an answer to the at least one question from the at least one participant, and transmission of information related to said answer and the at least one participant back to said server means; said server means being formed so as to use said information to associate the answer-related information with the at least one participant.

* * * * *